US008103253B2

(12) United States Patent
Gatzke et al.

(10) Patent No.: US 8,103,253 B2
(45) Date of Patent: Jan. 24, 2012

(54) SYSTEM AND METHOD FOR TRANSMITTING MESSAGES TO A WIRELESS COMMUNICATION DEVICE

(75) Inventors: Alan D. Gatzke, Bainbridge Island, WA (US); Aaron J. Belcher, Shoreline, WA (US); Kevin L. Chestnut, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 227 days.

(21) Appl. No.: 11/234,419

(22) Filed: Sep. 22, 2005

(65) Prior Publication Data

US 2007/0066284 A1    Mar. 22, 2007

(51) Int. Cl.
*H04M 11/10* (2006.01)

(52) U.S. Cl. .................... 455/413; 455/412.1; 455/412.2

(58) Field of Classification Search ........... 455/412–413
See application file for complete search history.

(56) References Cited

U.S. PATENT DOCUMENTS

| | | | | |
|---|---|---|---|---|
| 5,457,732 A | * | 10/1995 | Goldberg | 340/7.23 |
| 5,572,576 A | * | 11/1996 | Klausner et al. | 379/88.11 |
| 5,859,973 A | * | 1/1999 | Carpenter et al. | 709/203 |
| 5,918,182 A | * | 6/1999 | Korus et al. | 455/517 |
| 6,032,039 A | * | 2/2000 | Kaplan | 455/413 |
| 6,091,947 A | * | 7/2000 | Sumner | 455/413 |
| 6,119,167 A | | 9/2000 | Boyle et al. | 709/234 |
| 6,389,276 B1 | | 5/2002 | Brilla et al. | 455/413 |
| 6,658,485 B1 | * | 12/2003 | Baber et al. | 719/314 |
| 6,731,926 B1 | | 5/2004 | Link, II et al. | 455/412.2 |
| 7,277,955 B2 | * | 10/2007 | Elliott | 709/231 |
| 2002/0035616 A1 | | 3/2002 | Diamond et al. | 709/219 |
| 2002/0067805 A1 | | 6/2002 | Andrews | 379/67.1 |
| 2002/0154747 A1 | * | 10/2002 | Shtivelman | 379/88.19 |
| 2003/0130894 A1 | | 7/2003 | Huettner et al. | 705/14 |
| 2003/0228863 A1 | * | 12/2003 | Vander Veen et al. | 455/412.1 |
| 2004/0005877 A1 | | 1/2004 | Vaananen | 455/412.1 |

(Continued)

FOREIGN PATENT DOCUMENTS

EP    1 379 061 A2    1/2004

(Continued)

OTHER PUBLICATIONS

PCT Notification of Transmittal of the International Search Report and the Written Opinion of the International Searching Authority, or the Declaration with attached PCT International Search Report and PCT Written Opinion of the International Searching Authority in International Application No. PCT/US06/33091 dated Jul. 23, 2007, 11 pages, Jul. 23, 2007.

(Continued)

*Primary Examiner* — Steven Lim
(74) *Attorney, Agent, or Firm* — Baker Botts L.L.P.

(57) ABSTRACT

In accordance with one embodiment of the present invention, a method for communicating information to a user includes transmitting a plurality of indicator messages to a communication device associated with a particular user, each indicator message associated with an audio message for the user. The method also includes receiving, from the communication device, information indicating an order for two or more of the audio messages. Additionally, the method includes transmitting the audio messages to the communication device in the order indicated by the information indicating the order.

21 Claims, 3 Drawing Sheets

U.S. PATENT DOCUMENTS

| | | | |
|---|---|---|---|
| 2004/0023643 A1 | 2/2004 | Vander Veen et al. | 455/413 |
| 2004/0114744 A1* | 6/2004 | Trossen | 379/201.01 |
| 2004/0121762 A1* | 6/2004 | Chou et al. | 455/413 |
| 2004/0202117 A1 | 10/2004 | Wilson et al. | 370/310 |
| 2005/0105700 A1* | 5/2005 | Kim | 379/88.22 |
| 2005/0164693 A1 | 7/2005 | Yach et al. | |
| 2005/0182675 A1 | 8/2005 | Huettner | 705/14 |
| 2006/0262912 A1* | 11/2006 | Caputo et al. | 379/88.19 |
| 2007/0046456 A1* | 3/2007 | Edwards et al. | 340/539.1 |

FOREIGN PATENT DOCUMENTS

| | | |
|---|---|---|
| EP | 1 523 165 A2 | 4/2005 |
| WO | WO 98/58332 | 12/1998 |
| WO | WO2004/088637 A1 | 10/2004 |

OTHER PUBLICATIONS

"Comverse and Research in Motion to Integrated Visual Voicemail With Blackberry," *Research in Motion Limited*, 2005 Press Releases, www.rim.net/news/press/2005/pr-15_02_2005-01.shtml at the Internet, Feb. 15, 2005, 3 pages, Feb. 15, 2005.

Brad Smith, "Who's that Reading Your Voice Mail?" *Reed Business Information*, www.wirelessweek.com/article/CA528641.html?text=comverse at the Internet, May 1, 2005, 3 pages, May 1, 2005.

Supplemental European Search Report in European Application No. 0602260.7-2414/ 1927238 PCT/US2006033091, dated Jun. 9, 2011, 5 pages.

\* cited by examiner

SYSTEM AND METHOD FOR TRANSMITTING MESSAGES TO A WIRELESS COMMUNICATION DEVICE

TECHNICAL FIELD OF THE INVENTION

This invention relates, in general, to communication systems and, more particularly, to transmitting messages to a wireless communication device.

BACKGROUND OF THE INVENTION

Some devices that offer voice-communication capabilities are not configured to support the download and playback of recorded audio data. In addition, many devices that are able to receive and playback audio data, such as by receiving and playing audio data communicated as email attachments, may require a significant amount of time to download audio data over a data network. Thus, in many cases, it may be more effective to establish a voice connection to a messaging server that stores the audio recordings and to instruct the messaging server to play audio recordings from the user's account over the voice connection.

Many voicemail systems, however, play messages back to users in a serial fashion, starting with the voicemail message the user received first. Nonetheless, the user may not want to hear all of the messages that the user has received. Furthermore, the user may only have limited amount of time to check voicemail, such as while waiting for an airline flight, and may want to ensure that he or she hears a particular voicemail message received by the user.

SUMMARY OF THE INVENTION

In accordance with the present invention, the disadvantages and problems associated with wireless communication have been substantially reduced or eliminated. In particular, a system and method for transmitting messages to a wireless communication device are provided.

In accordance with one embodiment of the present invention, a method for communicating information to a user includes transmitting a plurality of indicator messages to a communication device associated with a particular user, each indicator message associated with an audio message for the user. The method also includes receiving, from the communication device, information indicating an order for two or more of the audio messages. Additionally, the method includes transmitting the audio messages to the communication device in the order indicated by the information indicating the order.

In accordance with another embodiment of the present invention, a system for communicating information to a user includes a memory and a processor. The memory is capable of storing processor instructions. The processor is capable of transmitting a plurality of indicator messages to a communication device associated with a particular user. Each indicator message is associated with an audio message for the user. The processor is also capable of receiving, from the communication device, information indicating an order for two or more of the audio messages. Additionally, the processor is capable of transmitting the audio messages to the communication device in the order indicated by the information indicating the order.

Technical advantages of certain embodiments of the present invention include providing a wireless user the ability to prioritize messages requested for playback by the user. Additional technical advantages of certain embodiments of the present invention include the ability to limit playback to only a particular subset of the voicemail messages the wireless user has received and to reduce the time spent initiating communication sessions with the voicemail server during playback. Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
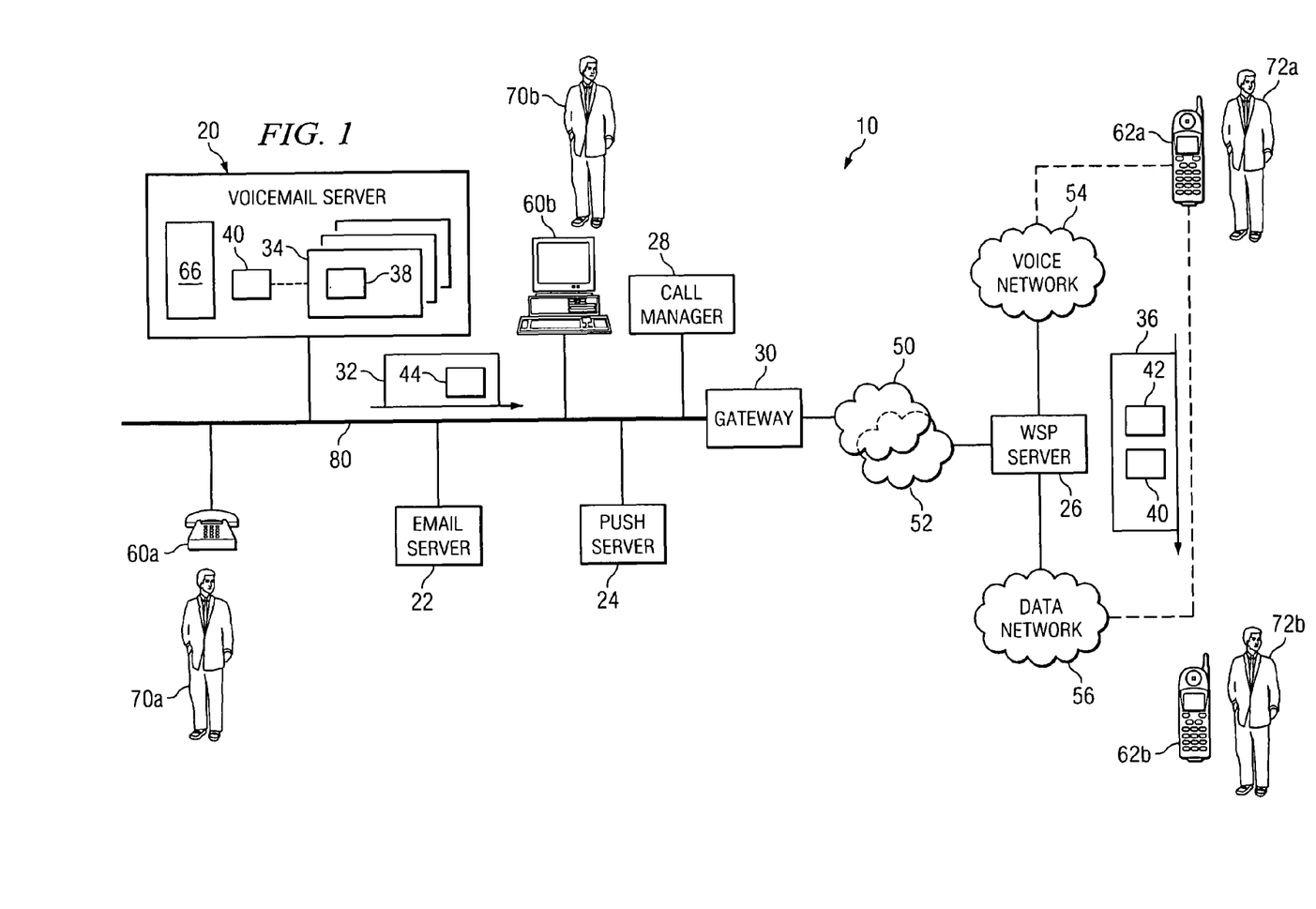
FIG. 1 illustrates a communication system according to a particular embodiment of the present invention.

FIG. 1 illustrates a communication system 10 in accordance with a particular embodiment of the present invention. In the illustrated embodiment, communication system 10 includes a voicemail server 20, an email server 22, a push server 24, a wireless service provider (WSP) server 26, a call manager 28, a gateway 30, a plurality of communication devices 60, and a plurality of wireless communication devices 62. Voicemail server 20, email server 22, push server 24, call manager 28, gateway 30, and communication devices 60 are coupled to one another by local area network (LAN 80) and are coupled to WSP server 26 by PSTN 50 and/or Internet 52. During operation of communication system 10, voicemail server 20, email server 22, push server 24, and WSP server 26 cooperate to provide wireless users 72 of wireless communication devices 62 with greater flexibility in retrieving voicemail and/or other forms of messages intended for those wireless users 72 from appropriate components of communication system 10.

Voice network 54 and data network 56 support wireless communication of voice and data, respectively, between WSP server 26 and wireless communication devices 62. Each of voice network 54 and data network 56 may represent any collection of hardware and/or software configured to communicate information between two or more endpoints, such as between a first wireless communication device 62 and a communication device 60 or another wireless communication device 62. Additionally, each of voice network 54 and data network 56 may include switches, trunks, central offices (COs), gateways, and/or any other suitable components in any suitable form or arrangement and may comprise any combination of public or private communication equipment and/or any combination of separate networks. Additionally, voice network 54 and data network 56 may incorporate any appropriate hardware and/or software for conducting wireless communication with wireless communication devices 62, such as cellular base stations, antennas, and/or cell sites. Moreover, although voice network 54 and data network 56 are capable of supporting wireless communication, a portion of the elements in either network may be coupled by wired connections as appropriate.

In addition, voice network 54 and data network 56 may support voice or data communication using any appropriate communication protocols. Furthermore, in particular embodiments, one or both of voice network 54 and data network 56 may be capable of supporting both data and voice communication and the characteristics of the two networks may cause one of the two networks to be preferred for a particular type of communication. In particular embodiments, data network 56 represents a packet-based communication network such as a General Packet Radio Service (GPRS) network, while voice network 54 represents a circuit-switched network such as a Global System for Mobile Tele-Communications (GSM) network. Nonetheless, either of voice network 54 and data network 56 may represent networks configured to use any appropriate technology and/or communication protocols.

Voicemail server 20 supports voicemail services for users 70 and wireless users 72. More specifically, voicemail server 20 may generate voicemail messages 34, receive voicemail messages 34 generated by other voicemail servers, store received or generated voicemail messages 34, and/or provide users 70 and wireless users 72 access to stored voicemail messages 34. As part of providing this functionality, voicemail server 20 may, in particular embodiments, create indicator messages 32 to be transmitted to wireless users 72 indicating that voicemail messages 34 have been recorded for those wireless users 72, as described in greater detail below. Although FIG. 1 illustrates an example embodiment of communication system 10 in which indicator messages 32 represent Simple Mail Transfer Protocol (SMTP) email messages, voicemail server 20 may generate indicator messages 32 in the form of Short Message Service (SMS) messages, Hypertext Transfer Protocol (HTTP) push messages, and/or any other appropriate form of messages.

Voicemail server 20 may include any appropriate combination of hardware and/or software suitable to provide the described messaging functionality. Additionally, although FIG. 1 illustrates an example embodiment of communication system 10 in which audio voicemail messages 34 are recorded for wireless users 70a, voicemail server 20 may be replaced or supplemented by any suitable messaging server configured to generate messages containing any appropriate type of content including voice, non-voice audio, text, and/or video content. The contents and operation of a particular embodiment of voicemail server 20 are described in greater detail below with respect to FIG. 2.

Email server 22 supports email and/or other suitable forms of messaging service for users 70 and wireless users 72. Email server 22 receives email messages from and routes email messages to communication devices 60 on LAN 80, other email servers on other LANs, and/or other appropriate components of communication system 10. More specifically, email server 22 receives indicator messages 32 from voicemail server 20 indicating the recording of a voicemail message 34 for particular users 70 or wireless users 72 and, if appropriate, transmits the received indicator messages 32 to communication devices 60 or 62 associated with these users 70 or 72. Email server 22 may include any appropriate combination of hardware and/or software suitable to provide the described functionality.

Although the description below focuses on an embodiment, in which certain functionalities are divided between voicemail server 20 and email server 22 in a particular manner, in alternative embodiments, functionality may be divided between voicemail server 20 and email server 22 in any appropriate manner based on the configuration of communication system 10. For example, in particular embodiments, voicemail server 20 and email server 22 may be part of a unified messaging system in which voicemail messages 34 are automatically transmitted to recipients as email messages. In such embodiments, voicemail server 20 may, instead of storing a voicemail message 34 for a particular caller, transmit the relevant voicemail message 34 and/or audio data 38 for that voicemail message 34 to email server 22. Email server 22 may then store the transmitted voicemail message 34 and/or audio data 38 until the appropriate user 70 or wireless user 72 requests retrieval of that voicemail message 34. Additionally, email server 22 may generate and transmit the associated indicator message 32 notifying appropriate wireless users 72 that they have received voicemail messages 34.

Push server 24 supports specialized email functionality for wireless users 72. In particular, push server 24 monitors traffic to email server 22 and pushes appropriate messages to WSP server 26 for transmission to wireless communication devices 62. As part of this functionality, push server 24 forwards indicator messages 32 to WSP server 26 for transmission to wireless communication devices 62. In particular embodiments of communication system 10, such as particular unified messaging systems, push server 24 may additionally be responsible for itself generating indicator messages 32 in response to voicemail messages 34 received by email server 22. Push server 24 may include any appropriate combination of hardware and/or software to facilitate the described functionality.

WSP server 26 supports wireless voice and data communication with wireless communication devices 62 over voice network 54 and data network 56, respectively. For example, WSP server 26, in particular embodiments, transmits email and other packet-based data communications to wireless communication devices 62 over data network 56 and establishes circuit-switched, voice communication sessions with wireless communication devices 62 over voice network 54. In particular embodiments, WSP server 26 is operated by a conventional, public wireless service provider and may support wireless service for multiple enterprises. Thus, WSP server 26 may interact with components on multiple different LANs 80. WSP server 26 may include any appropriate combination of hardware and/or software suitable to provide the described functionality.

In operation, voicemail servers 20, email server 22, push server 24, and WSP server 26 operate in conjunction with one another to provide enhanced messaging services to wireless users 72. In particular, push server 24 facilitates interaction between email server 22 and WSP server 26 to allow wireless communication devices 62 to communicate over both data network 56 and voice network 54. This capability may, in turn, allow wireless communication devices 62 to optimize communication services provided to wireless users 72.

As a specific example, a user 70 or wireless user 72 (assumed here to be user 70a) may utilize a communication device 60 or wireless communication device 62 (assumed here to be communication device 60a) to attempt communication with a particular wireless user 72 (assumed here to be wireless user 72a), such as by calling a particular communication device 60 an LAN 80 that is associated with wireless user 72a. If wireless user 72a does not answer the call, call manager 28 may forward the call to voicemail server 20 by connecting communication device 60a to voicemail server 20. User 70a may then record a voicemail message 34 for wireless user 72a. In particular embodiments, voicemail message 34 includes audio data 38, such as a .WAV file, recorded for wireless user 72a.

After generating voicemail message 34, voicemail server 20 may, in particular embodiments, store voicemail message 34 for subsequent playback. In particular embodiments, voicemail server 20 may additionally generate indicator message 32 and transmit indicator message 32 to email server 22. Indicator message 32 notifies wireless user 72a that wireless user 72a has received a voicemail message 34. Additionally, as part of recording voicemail message 34, voicemail server 20 may generate and assign a message identifier 40 to voicemail message 34 that identifies voicemail message 34 and/or its storage location. Voicemail server 20 may associated message identifier 40 with the newly-generated voicemail message 34 in memory and later use message identifier 40 to retrieve that voicemail message 34.

Additionally, voicemail server 20 may generate a message pointer 44 that identifies the newly-generated voicemail message 34 and/or its storage location in a manner useable by wireless communication devices 62. In particular embodiments, voicemail server 20 may generate message pointer 44 based on message identifier 40. Moreover, in particular embodiments, message pointer 44 may include some or all of the relevant message identifier 40. In particular embodiments, message pointer 44 represents a Uniform Resource Locator (URL) that specifies a storage location for the relevant voicemail message 34 and that includes message identifier 40. Voicemail server 20 may include message pointer 44 in indicator messages 32, as shown in the example in FIG. 1. In particular embodiments, message pointer 44 may be incorporated into a header, a body, and/or any other appropriate portion of indicator message 32.

Alternatively, particular embodiments of communication system 10 may represent unified messaging systems and, in such embodiments, voicemail server 20 may, instead of storing voicemail message 34, transmit voicemail message 34 and/or audio data 38 from voicemail message 34 to email server 22. Email server 22 may then store voicemail message 34, generate indicator message 32 (including, if appropriate, an associated message identifier 40 and/or message pointer 44), and transmit indicator message 32 to push server 24 for transmission to wireless communication device 62a. In general, however, functionality may be divided between voicemail server 20, email server 22, push server 24, and/or other components of communication system 10 in any appropriate manner as indicated above.

Meanwhile, push server 24 monitors traffic received by email server 22. When push server 24 detects the receipt by email server 22 of an indicator message 32 for any of wireless users 72, push server 24, in particular embodiments, forwards the indicator message 32 to WSP server 26 through PSTN 50 or Internet 52. WSP server 26 then transmits indicator message 32b to wireless communication device 62a through data network 56. Upon receiving indicator message 32b, wireless communication device 62a may provide an indication to wireless user 72a that wireless communication device 62a has received an indicator message 32 for wireless user 72a. For example, in particular embodiments, WSP server 26 may support email messaging for wireless communication device 62a, and wireless communication device 62a may receive indicator message 32b in the form of an email message. Wireless communication device 62a may then display, to wireless user 72a, the contents of an email "Inbox" to wireless user 72a that includes indicator message 32b and other email messages received by wireless communication device 62a.

While operating, wireless communication device 62a may receive a plurality of indicator messages 32. Wireless communication device 62a may store each of the indicator messages 32 and provide an indication to wireless user 72a as each is received. As a result of this process, wireless user 72a may be able to determine when wireless user 72a receives new voicemail messages 34. Furthermore, wireless user 72a may be able to obtain certain information about voicemail messages 34 based on the contents of indicator messages 32. For example, in particular embodiments, indicator message 32 may specify certain information about the caller that left the corresponding voicemail message, such as the name and phone number of user 70a. Wireless user 72a may be able to access this by viewing the contents of the "Inbox," by selecting the relevant indicator message 32, and/or by taking any other steps appropriate based on the configuration of wireless communication device 62a.

At an appropriate point during operation, wireless user 72a may decide to initiate playback of one or more voicemail messages 34 associated with indicator messages 32 received by wireless communication device 62a. Wireless user 72a may request the playback of voicemail messages 34 in any appropriate manner based on the configuration and capabilities of wireless communication device 62a. Moreover, as part of requesting playback of the relevant voicemail messages 34, user 72a may indicate an order for the playback of the relevant voicemail messages 34 in a suitable manner based on the configuration of communication system 10.

As one example of this process, wireless user 72a may, in particular embodiments, initiate playback of a particular voicemail message 34 by performing some operation with respect to the associated indicator message 32. For example, in particular embodiments, indicator message 32 may include a message pointer 44, such as a hyperlink or other appropriate form of pointer, that specifies a URL for the voicemail message 34 associated with that indicator message 32. In such embodiments, wireless user 72a may request playback of the associated voicemail message 34 by opening the relevant indicator message 32 and clicking on message pointer 44. Wireless user 72a may subsequently request playback of additional voicemail messages 34 in a similar fashion. Thus, as one example, wireless user 72a may indicate the requested order of playback by opening the indicator messages 32 and clicking the included message pointers 44 in a particular order.

Wireless communication device 62a may then request playback of the appropriate messages from voicemail server 20 by transmitting, for each requested voicemail message 34, a playback request 36 of an appropriate form to voicemail server 20 through WSP server 26 and push server 24. In particular embodiments, wireless communication device 62a requests playback of voicemail messages by transmitting an HTTP response to voicemail server 20 that identifies a requested voicemail message 34 and a communication address 42 associated with wireless communication device 62a. Consequently, as a result of this process, wireless user 72a may indicate the order for playback by the order in which wireless communication device 62a transmits the HTTP responses identifying the individual voicemail messages 34 selected for playback. Voicemail server 20 may then determine an order for playback based on the order in which the playback requests 36 were received by voicemail server 20 and/or based on a timestamp included in the playback requests 36.

As another example, in particular embodiments, each indicator message 32 in the "Inbox" maintained by wireless communication device 62a may be associated with a number based on the order it was received. Wireless user 72a may type in an ordered subset of those numbers to indicate to wireless device 62a an order for playback. Thus, as another example, wireless user 72a may indicate the request order of playback by explicitly specifying an order for the indicator messages 32 to wireless communication device 62a. Wireless communication device 62a may then generate a single playback request 36 that specifies the order for the complete set of requested voicemail message 34 and transmit this playback request 36 to voicemail server 20.

In general, however, wireless user 72 may select voicemail messages 34 for playback and/or indicate to voicemail server 20 an appropriate order for playback in any appropriate manner. Depending on the configuration and capabilities of wireless communication device 62a, wireless user 72a may provide any appropriate form of input to wireless communication device 62a to select voicemail messages 34 for playback and/or to specify an order for the playback of the selected voicemail messages 34. Moreover, as part of requesting playback or indicating the order, wireless user 72a may cause wireless communication device 62a to transmit any appropriate form of messages and/or other types of signals to voicemail server over either or both of data network 56.

In response to wireless user 72a requesting playback of voicemail messages 34 and/or indicating an order for playback, voicemail server 22 initiates playback of one or more voicemail messages 34 stored for wireless user 72a based on the order indicated by wireless user 72a. In response to receiving the request for playback, voicemail server 20 initiates a voice communication session with wireless communication device 62a through WSP server 26 and over voice network 54. In particular embodiments, voicemail server 20 initiates the voice communication session by calling the communication address 42 included in the playback request 36. Additionally, prior to, simultaneous with, or subsequent to initiating the voice communication session, voicemail server 20 may queue audio data 38 from the requested voicemail messages 34 in a queue 66 maintained by voicemail server 20. More specifically, voicemail server 20 may identify one or more sets of audio data 38 based on message identifiers 40 included in the received playback requests 36. Voicemail server 20 may then queue the relevant sets of audio data 38 in the order indicated by wireless user 72a. Example of this process are described in greater detail below with respect to FIG. 2.

Alternatively, in particular embodiments, such as certain unified messaging systems, email server 22 may be responsible for storing voicemail messages 34 and/or the associated audio data 38. In such embodiments, voicemail server 20 may request the appropriate audio data 38 from email server 22 using message identifiers 40 included in the relevant playback requests 36. Voicemail server 20 may then queue the received audio data 38, as described above.

After voicemail server 20 initiates the voice communication session and queues some or all of the requested audio data 38, voicemail server 20 may begin playing the requested audio data 38 as part of the voice communication session. Additionally, voicemail server 20 may store additional sets of audio data 38 in queue 66 as subsequent playback requests 36 are received from communication device 60a. In particular embodiments, as voicemail server 20 completes playback of a particular voicemail message 34, voicemail server 20 may seamlessly initiate playback of the next voicemail message 34 in queue 66. Alternatively, voicemail server 20 may, following the completion of the first voicemail message 34, prompt wireless user 72a to enter commands associated with particular operations, such as to delete or save the first voicemail message 34. Voicemail server 20 may then take any appropriate actions based on these commands.

Voicemail server 20 may then continue to play voicemail messages 34 to wireless communication device 62a until all of the voicemail messages 34 in queue 66 have been played. Once queue 66 has been emptied, voicemail server 20 may terminate the voice communication session established between voicemail server 20 and wireless communication device 60a. Meanwhile, in particular embodiments, voicemail server 20 may continue to transmit indicator messages 32 to wireless user 72a as additional voicemail messages 34 are received for wireless user 72a, and wireless user 72a may continue to transmit playback requests 36 to voicemail server 20, prompting voicemail server 20 to queue more sets of audio data 38 if the communication session is still active.

Thus, in particular embodiments of communication system 10, wireless user 72a is able to specify an order for the playback of voicemail messages 34 received by wireless user 72a. This may allow wireless user 72a to request playback for only a particular subset of voicemail messages 34 thereby eliminating the need for wireless user 72a to listen to voicemail messages 34 that wireless user 72a can clearly tell are lengthy or less important. Additionally, by requesting playback of voicemail messages 34 of greater importance first, wireless user 72 may be able optimize playback of voicemail messages 34 when wireless user 72 only has a limited time to listen to voicemail messages 34. Furthermore, by queuing for playback audio data 38 from multiple requested voicemail messages 34, voicemail server 20 may eliminate the need to initiate and terminate separate voice communication sessions for the playback of each individual voicemail message 34. As a result, particular embodiments of communication system 10 may provide multiple operational benefits. Various embodiments of communication system 10, however, may exhibit some, none, or all of these benefits.

Figure 2:
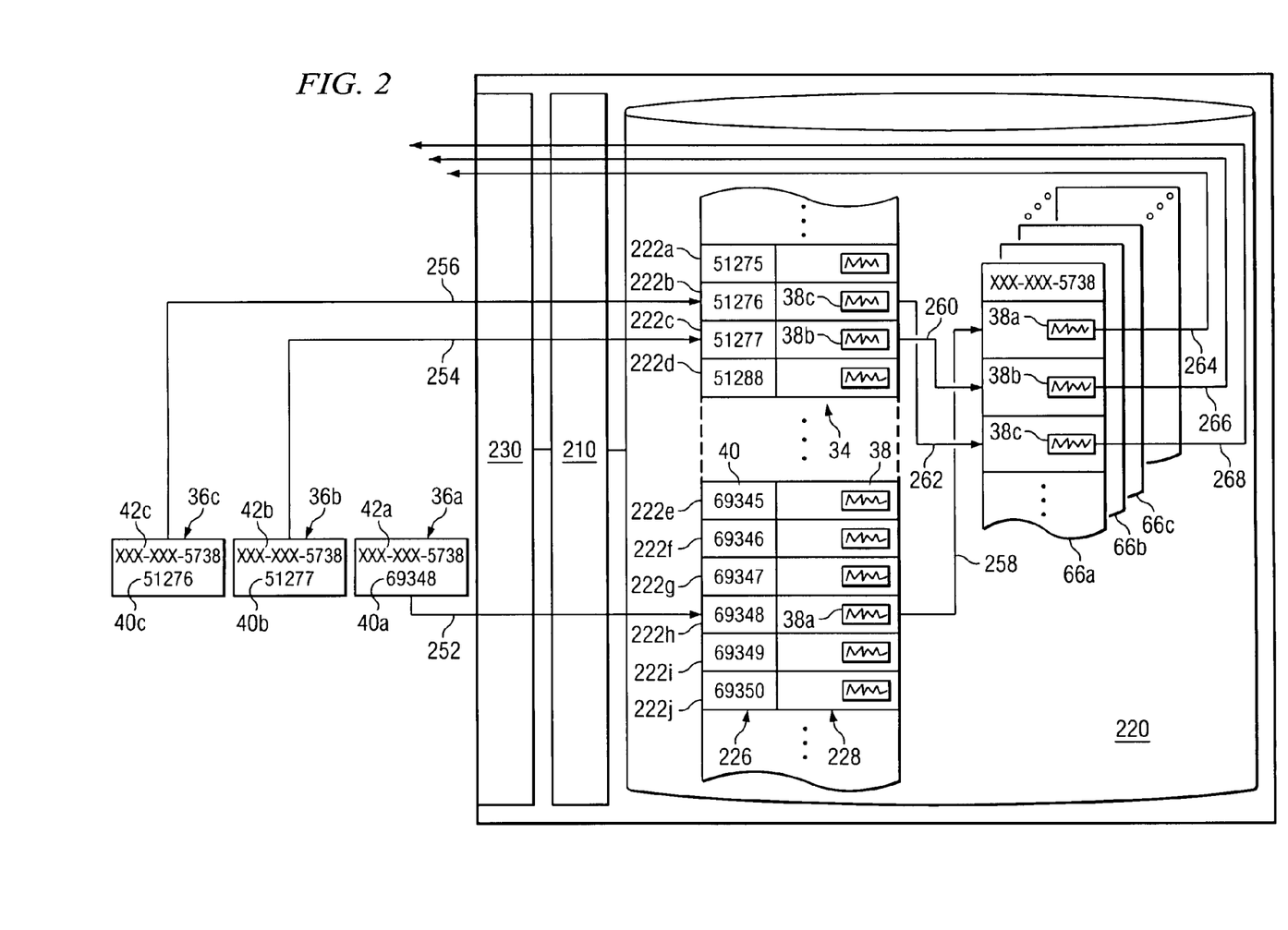
FIG. 2 illustrates a voicemail server that may be utilized in particular embodiments of the communication system.

FIG. 2 illustrates voicemail server 20 according to a particular embodiment. As illustrated, voicemail server 20 includes a processor 210, a memory 220, and a network interface 230. As noted above, voicemail server 20 is provided as one example of a messaging server that may be utilized in particular embodiments of communication system 10. The example embodiment of voicemail server 20 is operable to generate and store voicemail messages 34 for wireless users 72 and, upon request, to play one or more voicemail messages 34 to wireless users 72 as part of a voice communication session between voicemail server 20 and the associated wireless communication devices 62.

Processor 210 is operable to execute instructions associated with the functionality of voicemail server 20. Processor 210 may represent any suitable component capable of processing and/or communicating electronic information. Examples of processor 210 include, but are not limited to, application-specific integrated circuits (ASICs), field-programmable gate arrays (FPGAs), digital signal processors (DSPs) and any other suitable specific or general purpose processors.

Memory 220 store processor instructions and/or any other appropriate information used by voicemail server 20. Memory 220 may represent any collection and arrangement of volatile or non-volatile, local or remote devices suitable for storing data. Examples of memory 220 include, but are not limited to, random access memory (RAM) devices, read only memory (ROM) devices, magnetic storage devices, optical storage devices, or any other suitable data storage devices.

Network interface 230 comprises an interface operable to facilitate communication between voicemail server 20 and other components on LAN 80. Network interface 230 may include any appropriate combination of hardware and/or software suitable to interface voicemail server 20 and other elements of communication system 10. In particular embodiments, network interface 230 may comprise a Network Interface Card (NIC), and any appropriate controlling logic, that is suitable to support communication between voicemail server 20 and the associated LAN 80 using the Ethernet or Token Ring protocol.

To illustrate certain aspects of the playback process according to a particular embodiment of voicemail server 20, FIG. 2 shows an example in which voicemail server 20 receives, in order, playback requests 36a, 36b, and 36c. Upon receiving playback request 36a, voicemail server 20 identifies a storage location 222 based on message identifier 40a. For example, in particular embodiments, voicemail server 20 hashes the relevant message identifier 40a, using an appropriate hashing function, to determine a memory address where a corresponding voicemail message 34 is stored. In the illustrated example, message identifier 40 hashes to a memory address associated with storage location 222h, as suggested by arrow 252.

Voicemail server 20 then retrieves the requested voicemail message 34 from the identified storage location 222h and voicemail server 20 stores audio data 38a from the voicemail message 34 in storage location 222h in a queue 66, as indicated by arrow 258 in FIG. 2. In particular embodiments, voicemail server 20 may be capable of supporting playback to multiple wireless users 72 simultaneously, and voicemail server 20 may store audio data 38a in a particular queue 66 associated with the requesting wireless communication device 72, shown as queue 66a in the illustrated example. At an appropriate time after receiving playback request 36a, voicemail server 20 initiates a communication session with the appropriate wireless communication device 62 using the communication address 42 included in playback request 36a. Once the communication session is established, voicemail server 20 initiates playback of audio data 38a from queue 66a, as indicated by arrow 264 in FIG. 2. If voicemail server 20 completes playback of audio data 38a before additional audio data 38 is stored in queue 66a, voicemail server 20 may terminate the communication session.

In the illustrated example, voicemail server 20 receives playback request 36b from the same wireless communication device 62 at some point after receiving playback request 36a. As with playback request 36a, voicemail server 20 identifies a storage location 222 in memory 220 where the requested voicemail message 34, in this case voicemail message 34b, is stored. In the illustrated example, voicemail server 20 hashes message identifier 40b to determine that voicemail message 34b is stored in storage location 222c, as suggested by arrow 254. Voicemail server 20 then retrieves the voicemail message 34 stored in storage location 222c and stores audio data 38b from voicemail message 34b in queue 66a, as indicated by arrow 260. If voicemail server 20 completed playing audio data 38a from queue 66a before audio data 38b is stored in queue 66a, voicemail server 20 may have terminated the communication session with the requesting wireless communication device 62. If so, voicemail server 20 initiates a new communication session and, once the communication session is established, begins playback of audio data 38b to the requesting wireless communication device 62. If audio data 38b is instead stored in queue 66a before voicemail server 20 completes playback of audio data 38a (as shown in FIG. 2), voicemail server 20 may automatically begin transmitting audio data 38b to the requesting wireless communication device 62 immediately after completing playback of audio data 38a, as indicated by arrow 266.

In the illustrated example, voicemail server 20 receives playback request 36c from the same wireless communication device 62 at some point after receiving playback requests 36a and 36b. As with playback requests 36a and 36b, voicemail server 20 identifies a storage location 222 in memory 220 where the requested voicemail message 34 is stored, in this case storage location 222b, as indicated by arrow 256. Voicemail server 20 then retrieves audio data 38c from the voicemail message 34 stored in storage location 222b and stores audio data 38c in queue 66a, as indicated by arrow 262. If voicemail server 20 completed playing audio data 38b from queue 66a before audio data 38c is stored in queue 66a, voicemail server 20 may have terminated the communication session with the requesting wireless communication device 62. If so, voicemail server 20 initiates a new communication session and, once the communication session is established, begins playback of audio data 38c to the requesting wireless communication device 62. If audio data 38c is instead stored in queue 66a before voicemail server 20 completes playback of audio data 38b (as shown in the example of FIG. 2), voicemail server 20 may automatically begin transmitting audio data 38c to the requesting wireless communication device 62 immediately after completing playback of audio data 38b, as indicated by arrow 268.

Thus, in particular embodiments, after initiating playback of a particular set of audio data 38 in response to a first playback request 36, voicemail server 20 may be configured to queue audio data 38 for playback of subsequent playback requests 36 in a queue 66 for playback during the same communication session as the first set of audio data 38. This may allow voicemail server 20 to respond to multiple playback requests 36 without initiating a new communication session to respond to each playback request 36. This capability may, in turn, save time for the requesting wireless user 72, conserve battery power on the requesting wireless communication device 62, reduce the airtime costs incurred by the requesting wireless user 72, and simplify operation of communication system 10. As a result, particular embodiments of voicemail server 20 may provide multiple operational benefits.

As noted above, particular embodiments of communication system 10 may comprise unified messaging systems. In such embodiments, email server 22 may instead be responsible for storing voicemail messages 34 and voicemail server 20 may retrieve the requested voicemail message 34 by communicating the associated message identifier 40 to email server 22. Email server 22 may then use the received message identifier 40 to retrieve the requested voicemail message 34 from a storage location in a memory of email server 22. As a result, the above description may be modified in appropriate ways to account for these variations in such embodiments of communication system 10.

Figure 3:
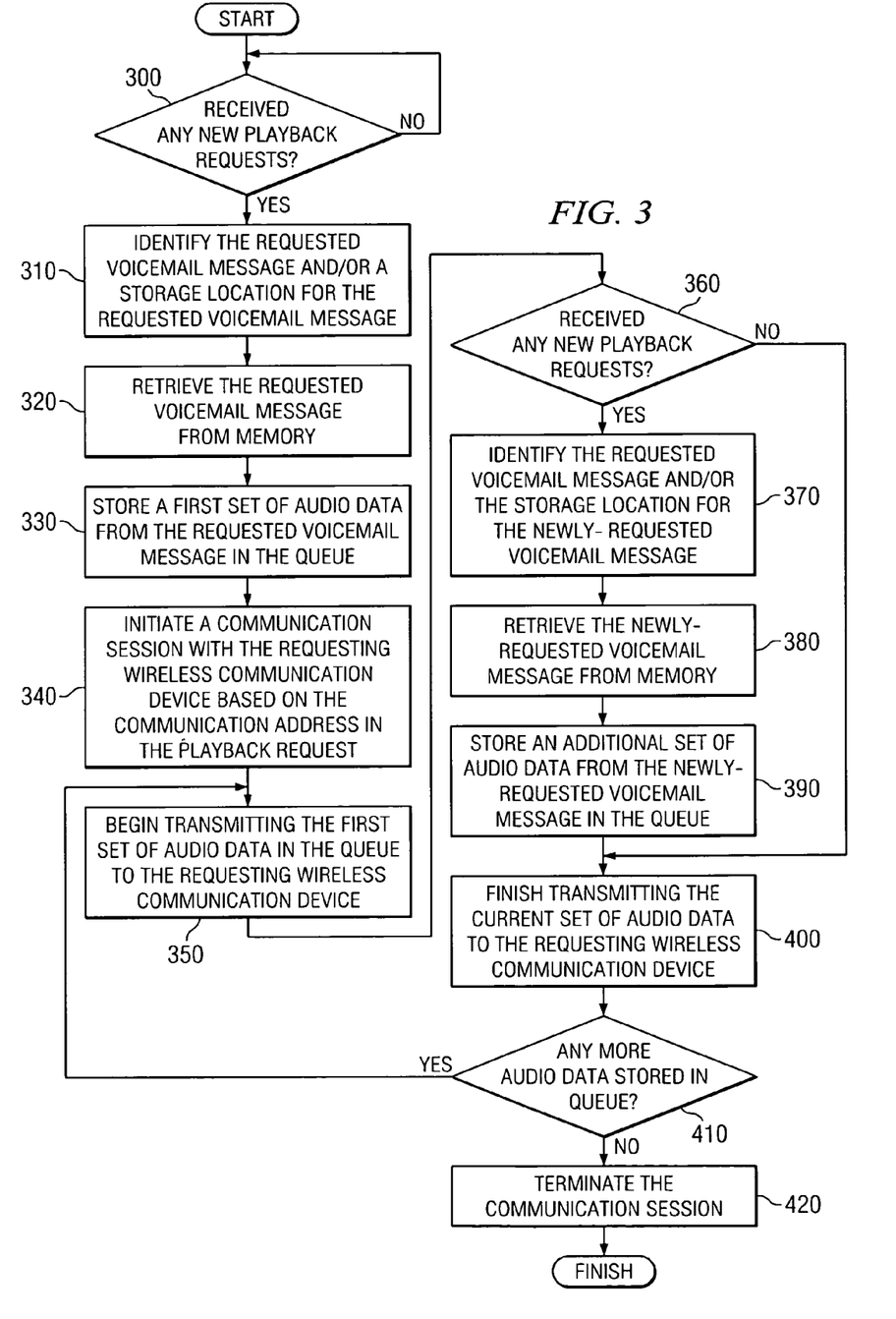
FIG. 3 is a flowchart illustrating an example operation of a particular embodiment of the voicemail server.

FIG. 3 is a flowchart illustrating an example operation of a particular embodiment of voicemail server 20 in responding to playback requests 36 received from a requesting wireless communication device 62. In the described embodiment, voicemail server 20 is assumed to store voicemail messages 34 locally. Although the description below focuses, for the sake of simplicity, on an embodiment of voicemail server 20 capable of performing playback to only a single wireless user 72 at once, particular embodiments of voicemail server 20 may be configured to support playback to multiple wireless users 72 simultaneously. Thus, the following description may be modified in appropriate ways to account for these variations in suitable embodiments of communication system 10. In general, FIG. 3 illustrates operation of an embodiment of voicemail server 20 that performs particular steps in a particular order. Alternative embodiments may omit any of these steps or include any appropriate additional steps. Additionally, alternative embodiments may perform the illustrated steps in any appropriate order.

At the outset of this example, voicemail server 20 is assumed to have no audio data 38 currently stored in queue 66 and no communication session is assumed to be active between voicemail server 20 and any wireless communication devices 62 for purposes of playback. Thus, operation, in the illustrated example, begins at step 300 with voicemail server 20 determining whether voicemail server 20 has received any new playback requests 36 from any wireless communication devices 62. If not, operation returns to step 300 until voicemail server 20 receives a playback request 36 from a wireless user 72 of communication system 10. Once voicemail server 20 has received a playback request 36, operation continues at step 310.

At step 310, voicemail server 20 identifies a requested voicemail message 34 and/or a storage location 222 for the requested voicemail message 34 based on a message identifier 40 included in the received playback request 36. At step 320, voicemail server 20 retrieves the requested voicemail message 34 from memory 220. Voicemail server 20 then stores a first set of audio data 38 from the requested voicemail message 34 in a queue 66 at step 330.

At step 340, voicemail server 20 initiates a communication session between voicemail server 20 and the requesting wireless communication device 62, based on a communication address 42 included in the relevant playback request 36. Once a communication session is active between voicemail server 20 and the requesting wireless communication device 62, voicemail server 20 begins transmitting the first set of audio data 38 to the requesting wireless communication device 62 as part of the communication session, at step 350. While transmitting the first set of audio data 38 to the requesting wireless communication device 62, voicemail server 20 determines whether voicemail server 20 has received any new playback requests at step 360. If not, operation continues at step 400.

If voicemail server 20 has received additional playback requests 36, voicemail server 20, at step 370, identifies a requested voicemail message 34 and/or a storage location for the newly-requested voicemail message 34 based on a message identifier 40 included in the received playback request 36. At step 380, voicemail server 20 retrieves the newly-requested voicemail message 34 from memory 220. Voicemail server 20 then stores an additional set of audio data 38 from the newly-requested voicemail message 34 in a queue 66 at step 390.

At step 400, voicemail server 20 finishes transmitting the current set of audio data 38 to the requesting wireless communication device 62. Voicemail server 20 determines whether any more audio data 38 is stored in queue 66 at step 410. If so, operation continues at step 350. If no more sets of audio data 38 are stored in queue 66, voicemail server 20 may terminate the communication session with the requesting wireless communication device 62 at step 420. Operation of voicemail server 20 may then end.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for communicating information to a user, comprising:
    transmitting a first indicator message to a communication device associated with a particular user, the first indicator message indicating receipt of a first audio message for the user;
    after transmitting the first indicator message, transmitting a second indicator message to the communication device, the second indicator message indicating receipt of a second audio message for the user;
    receiving, from the communication device, a first playback request requesting playback of the second audio message;
    in response to receiving the first playback request, storing audio data associated with the second audio message in a queue in electronic memory;
    receiving, from the communication device, a second playback request requesting playback of the first audio message while transmitting audio data associated with the second audio message to the communication device from the queue;
    in response to receiving the second playback request, storing audio data associated with the first audio message in the queue while concurrently transmitting audio data associated with the second audio message to the communication device from the queue; and
    after completing transmission of the audio data associated with the second audio message to the communication device, transmitting audio data associated with the first audio message to the communication device from the queue.

2. The method of claim 1, further comprising:
    storing the first and second audio messages in a plurality of storage locations in electronic memory in an order selected by the user, the first and second audio messages stored by storing the first audio message in the queue and then storing the second audio message in the queue after the first audio message, the second audio message selected by the user after the first audio message.

3. The method of claim 1, wherein:
    transmitting the first and second indicator messages to the communication device comprises transmitting the first and second indicator messages to the communication device over a first network; and
    transmitting the audio data associated with the first and second audio messages to the communication device comprises transmitting the audio data associated with the first and second audio messages to the communication device over a second network.

4. The method of claim 3, wherein the first network supports communication in accordance with a packet-based communication protocol and wherein the second network supports communication in accordance with a circuit-switched communication protocol.

5. The method of claim 1, wherein transmitting the first and second audio messages to the communication device comprises:
    initiating a voice communication session with the communication device; and
    transmitting the first and second audio messages to the communication device as part of the voice communication session.

6. The method of claim 1, wherein transmitting the first and second indicator messages comprises:
    receiving, from a voicemail server, the first and second indicator messages, each indicator message indicating the voicemail server has recorded an audio message for the user; and
    adding information identifying a storage location associated with the audio message.

7. The method of claim 6, wherein adding information identifying the storage location comprises adding a Uniform Resource Locator (URL) associated with the audio message.

8. The method of claim 1, wherein transmitting the first and second indicator messages comprises:
- receiving, from a voicemail server, the first and second indicator messages, each indicator message indicating the voicemail server has recorded an audio message for the user; and
- adding a message identifier associated with the audio message and a communication address associated with the communication device.

9. The method of claim 1, wherein transmitting the first and second audio messages to the communication device comprises:
- initiating a communication session with the communication device based on a communication address; and
- transmitting the first and second audio messages to the communication device as part of the communication session.

10. A device for communicating information to a user, comprising:
- a memory operable to store processor instructions; and
- a processor operable to:
  - transmit a first indicator message to a communication device associated with a particular user, the first indicator message indicating receipt of a first audio message for the user;
  - after transmitting the first indicator message, transmit a second indicator message to the communication device, the second indicator message indicating receipt of a second audio message for the user;
  - receive, from the communication device, a first playback request requesting playback of the second audio message;
  - in response to receiving the first playback request, store audio data associated with the second audio message in a queue;
  - receive, from the communication device, a second playback request requesting playback of the first audio message while transmitting audio data associated with the second audio message to the communication device from the queue;
  - in response to receiving the second playback request, store audio data associated with the first audio message in the queue while concurrently transmitting audio data associated with the second audio message to the communication device from the queue; and
  - after completing transmission of the audio data associated with the second audio message to the communication device, transmit audio data associated with the first audio message to the communication device from the queue.

11. The device of claim 10, wherein the processor is operable to:
- store the first and second audio messages in a plurality of storage locations in an order selected by the user, the first and second audio messages stored by storing the first audio message and then storing the second audio message after the first audio message, the second audio message selected by the user after the first audio message.

12. The device of claim 10, wherein the processor is operable to:
- transmit the first and second indicator messages to the communication device by transmitting the first and second indicator messages to the communication device over a first network, and
- transmit the audio data associated with the first and second audio messages to the communication device by transmitting the audio data associated with the first and second audio messages to the communication device over a second network.

13. The device of claim 12, wherein the first network supports communication in accordance with a packet-based communication protocol and wherein the second network supports communication in accordance with a circuit-switched communication protocol.

14. The device of claim 10, wherein the processor is operable to transmit the first and second audio messages to the communication device by:
- initiating a voice communication session with the communication device; and
- transmitting the first and second audio messages to the communication device as part of the voice communication session.

15. The device of claim 10, wherein the processor is operable to transmit the first and second indicator messages by:
- receiving, from a voicemail server, the first and second indicator messages, each indicator message indicating the voicemail server has recorded an audio message for the user; and
- adding information identifying a storage location associated with the audio message.

16. The device of claim 15, wherein the processor is operable to add information identifying the storage location by adding a Uniform Resource Locator (URL) associated with the audio message.

17. The device of claim 10, wherein the processor is operable to transmit the first and second indicator messages by:
- receiving, from a voicemail server, the first and second indicator messages, each indicator message indicating the voicemail server has recorded an audio message for the user; and
- adding a message identifier associated with the audio message and a communication address associated with the communication device.

18. The device of claim 10, wherein the processor is operable to transmit the first and second audio messages to the communication device by:
- initiating a communication session with the communication device based on a communication address; and
- transmitting the first and second audio messages to the communication device as part of the communication session.

19. One or more non-transitory computer readable media storing code, when executed by one or more processors, operable to:
- transmit a first indicator message to a communication device associated with a particular user, the first indicator message indicating receipt of a first audio message for the user;
- after transmitting the first indicator message, transmit a second indicator message to the communication device, the second indicator message indicating receipt of a second audio message for the user;
- receive, from the communication device, a first playback request requesting playback of the second audio message;
- in response to receiving the first playback request, store audio data associated with the second audio message in a queue in electronic memory;
- receive, from the communication device, a second playback request requesting playback of the first audio message while transmitting audio data associated with the second audio message to the communication device from the queue;

in response to receiving the second playback request, store audio data associated with the first audio message in the queue while concurrently transmitting audio data associated with the second audio message to the communication device from the queue; and after completing transmission of the audio data associated with the second audio message to the communication device, transmit audio data associated with the first audio message to the communication device from the queue.

20. The media of claim 19, the code operable to transmit the first and second indicator messages by:

receiving, from a voicemail server, the first and second indicator messages, each indicator message indicating the voicemail server has recorded an audio message for the user; and adding information identifying a storage location associated with the audio message.

21. The media of claim 19, the code operable to transmit the first and second indicator messages by:

receiving, from a voicemail server, the first and second indicator messages, each indicator message indicating the voicemail server has recorded an audio message for the user; and adding a message identifier associated with the audio message and a communication address associated with the communication device.

* * * * *